June 10, 1952  H. P. WELLS  2,599,681
CARVING BOARD UNIT
Filed Feb. 8, 1950

HORACE P. WELLS.
INVENTOR.

BY Oltech & Knoblock

ATTORNEYS.

Patented June 10, 1952

2,599,681

UNITED STATES PATENT OFFICE 2,599,681

CARVING BOARD UNIT

Horace P. Wells, South Bend, Ind.

Application February 8, 1950, Serial No. 143,025

2 Claims. (Cl. 146—215)

This invention relates to improvements in carving board units, and more particularly to a carving board unit intended for household use.

Many uses exist in a home for carving and cutting boards, and many advantages are obtained from the use of such boards. Among these advantages are the avoidance of the dulling of a knife, and the avoidance of the marring of metal platters, work tables, and other surfaces upon which the article to be carved or sliced is usually supported if a cutting board is not used. The carving of meat of irregular shape, such as a fowl, a roast, ham or leg of lamb, is greatly simplified by the use of a board having impaling members to hold the meat against sliding while it is being cut and to avoid splashing of meat juices. Still other advantages obtained by the use of such boards are the accuracy and uniformity of cut which is obtainable when using the board, avoidance of injury to the carver, and the avoidance of spilling or splashing of meat juices upon a table cloth. Heretofore these advantages could not all be realized in a single unit; rather it was necessary to have a plurality of separate boards in order that all such advantages could be realized. The separate boards present the problem of storage, lack of convenience caused by separate handling and because of difficulty in locating the proper board when needed. Also, when one of the boards included impaling pins to anchor meat thereon, danger existed unless such board was provided with a storage case of its own, by reason of the possibility of accidental injury by contact with the impaling pins when working or reaching into the storage space in which the pin mounting board was stored.

It is the primary object of this invention to provide a carving board unit which will permit the realization of the above enumerated and all other advantages which accrue from the use of a carving board and which at the same time will overcome the disadvantages experienced with the use of that number of conventional carving boards which would be required for the realization of the same advantages.

A further object is to provide a carving board unit which is composed of a pair of boards adapted to be used individually or jointly, wherein one board mounts impaling members which serve to hold the boards in register when they are used jointly, and wherein each board has a non-slip supporting means for holding it in elevated position for use, which supporting means space said boards when they are used jointly.

A further object is to provide a simple, efficient and compact carving board unit which is adapted to serve all carving conditions and to fit in a serving platter, which board is composed of a plurality of separately usable parts constructed to interfit conveniently with each other for both use and storage.

A further object is to provide a carving board unit including a board having a plurality of impaling pins projecting from its upper surface, and a second board recessed at its bottom to fit over and protect said pins and to avoid personal injury from the pins, said second board being usable independently of said first board or jointly therewith as a top work panel of an assembled carving unit.

Other objects will be apparent from the following specification.

Figure 1:
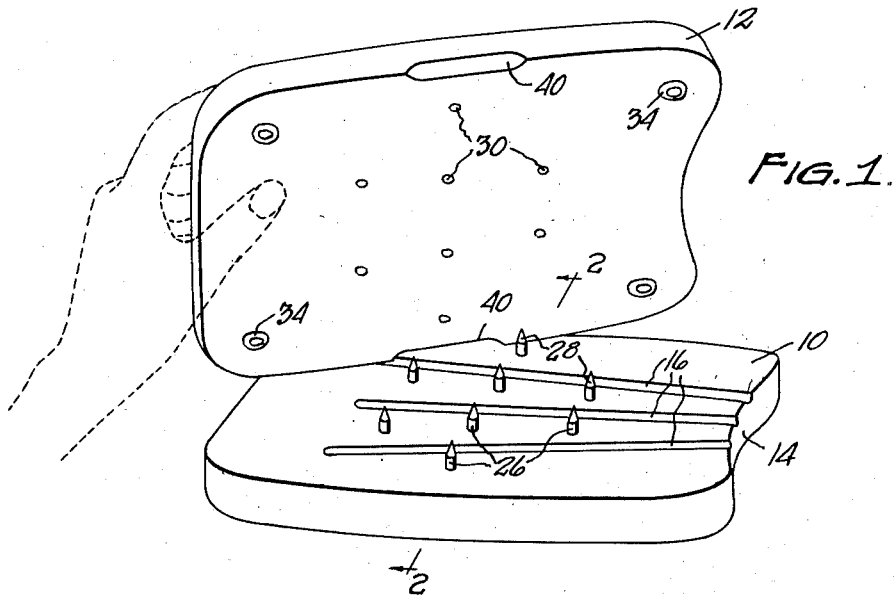
Fig. 1 is a perspective view of the carving board unit showing the boards separated in the relation immediately preceding assembly thereof or immediately following disassembly, and illustrating the relation of the parts.

Referring to the drawing which illustrates the preferred embodiment of the invention, the numeral 10 designates a bottom board, and the numeral 12 designates a top board. These boards are both flat and of substantially uniform thickness throughout so that the top and bottom surfaces thereof are both flat and are parallel to each other. The boards preferably are of substantially similar shape although the identity of shape is not necessary and board 12 may be either smaller or larger than board 10 and also may be of a different thickness. The boards in each instance will preferably be formed of wood although the parts may be formed of other rigid materials, the primary requirement in this respect being that the material of which they are formed shall be of a character which can be cut by a knife and which will not injure or damage a knife blade. The bottom panel 10 is preferably of a shape substantially as illustrated, being of modified oblong or oval shape characterized by a length greater than its width, by rounded corner portions and preferably by a concave end surface 14. The board 10 is preferably of a size which will fit within a metal meat serving platter, such as a silver platter, of a type having a contoured bottom surface and a well portion at one end thereof into which juices which exude from the meat will flow and be collected. The board preferably will be of such size and shape that its concave end face will be located adjacent to the platter well and will leave that well uncovered. The top surface of the panel 10 is preferably provided with a plurality of longitudinally extending grooves 16 which terminate and are open at the concave board edge 14. The grooves 16 preferably extend for the major portion of the board, terminating spaced from the end opposite the concave end 14 and preferably being of progressively increasing depth and width from left to right as viewed in Fig. 1, that is, the grooves increase in depth and width as they approach the board end 14. These grooves provide means for the collection of meat juices and for flow thereof lengthwise of the board end 14 which is positioned adjacent to the well of the platter as described previously.

Figure 3:
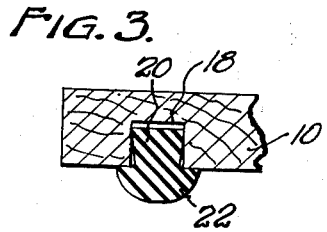
Fig. 3 is a vertical sectional detail view of the bottom panel, illustrating the manner in which the supporting members are secured thereto.
Figure 4:
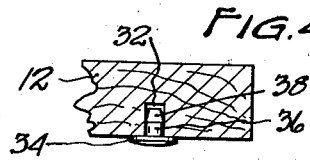
Fig. 4 is a vertical detail sectional view of the upper panel, illustrating the manner in which the supporting spacing means thereof are secured thereto.

The board 10 is provided with a plurality of supporting members or feet, as best seen in Fig. 3. The board is provided with a recess 18 in its bottom surface spaced from the edges thereof and extending for a part only of the thickness or depth of the board. Within this recess is inserted a stud or shank 20 of a flexible resilient material, such as synthetic rubber which preferably possesses the property of resistance to corrosion or attack by greases and fats and which also has non-slip or friction properties with a contacting surface when dry. The shank 20 has an enlarged substantially part-spherical portion 22 projecting from the lower end thereof and providing a shoulder bearing against the bottom surface of the board 10. The shank 20 is preferably of a tapered or frusto conical shape with its small dimension portion adjacent to the end or head 22 and of a dimension slightly less than the diameter of the board portion 18, while its outer or free end portion is preferably slightly greater than the diameter of the bore 18. The boards are so formed that the supporting members may easily be inserted into the bore 18 and, when so inserted, will normally hold themselves in place by friction.

The top surface of the board 10 has formed therein a plurality of bores 24 extending partially therethrough. Each bore receives the shank 26 of a metal pin. The pin 26 preferably has a tight or a press fit within the bore 24 and is held therein firmly against release and without play. The pins 26 preferably are formed of stainless steel or of metal of such character or so plated or treated that it resists corrosion and resists rusting. The pins 26 preferably are substantially uniform in dimension and each projects substantially the same distance from the top surface of the board 10 and terminates in a conical pointed end portion 28. The length of the portion of each pin projecting from the top surface of the board is sufficient to provide a firm anchorage with a piece of meat, and at the same time preferably is less than the thickness of the board. The board 10 so constructed may obviously be used as a carving board for carving meat, and particularly meat of irregular shape and contour, such as fowl, a roast, a ham or leg of lamb. The provision of the soft flexible foot members 22 insures that the board itself is held clear of and above a metal serving platter if used in conjunction therewith, or against any other surface upon which the board may be supported for use. Thus there is no danger that the board will mar the surface or member which it contacts, and the frictional properties of the synthetic rubber of which the feet are formed serves to hold the board against slippage upon its supporting surface.

The board 12 is provided at its bottom face with a plurality of apertures or bores 30 extending only partially therethrough and arranged in the same patterned and spaced relation which characterizes the arrangement of the pins 22 upon the board 10. The bores 30 are preferably of a size slightly larger than the diameter of the pins so as to have a free fit therewith but preferably a snug fit so as to substantially limit or prevent lateral movement of one of the parts 10, 12 relative to the other in the plane of that board when the boards are arranged in superimposed relation with the pins 26 seated in the bores 30. The board 12 will be of such depth that when the pins do interfit in this manner, the pins will not engage the inner end of the bore and at the same time the bores will not extend completely through the board 12.

Figure 2:
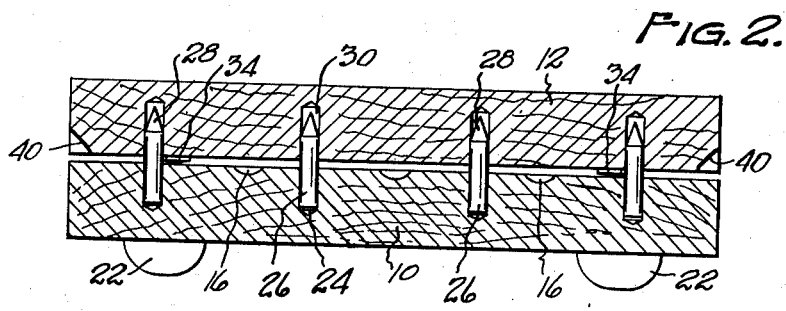
Fig. 2 is an enlarged transverse sectional view taken on line 2—2 of Fig. 1 and illustrating the board in its assembled condition.

The board 12 is also provided at its bottom surface and spaced from the margins thereof with a plurality of bores 32 open at its bottom face and extending partially therethrough. These bores 32 are so arranged that when the boards are superimposed as illustrated in Fig. 2 with the pins 26 fitting in the bores 30, the bores 32 will be clear of those pins and of the grooves 16 in the board 10. Spacer members, preferably formed of synthetic rubber material and of flexible and resilient character, are carried by the board 12 at each of the bores 32, said members each having a large, substantially flat head portion 34 and a central reduced shank portion 36 of a diameter equal to or slightly greater than the diameter of the bore 32. The inner end of the shank 36 is preferably tapered at 38 to facilitate insertion of the shank into the bore 32, and the total overall length of the shank 36, 38 is less than the depth of the bore 32. In the normal arrangement of the parts, the shank 36 will have a snug non-slip frictional interlocking fit within the bore 32 which will hold it against release from said bore and will position it with the inner face of the large head 34 bearing against the bottom surface of the board 12. The head 34 serves as means to space the two boards 10 and 12 apart when they are assembled as illustrated in Fig. 2. The head 34 is preferably thin, however, so that the spacing of the parts is small and a substantial interfit is formed between the pins 26 and the bores 30 to hold the boards 10, 12 against lateral play. One of the boards, here illustrated as the board 12, is provided with beveled portions 40 at spaced opposed points thereon which facilitate the insertion of the fingers of the user between the boards to separate the same.

The board 12 may be used as an individual cutting board for cutting flat cuts of meat, such as steaks, and for slicing bread, cutting vegetables, dicing food, and the like. When so used individually, it is positioned above its supporting surface slightly by the members 34, and the formation of said members from synthetic rubber or other frictional material resists or avoids slippage of the board upon its support.

The board 12 may also be used as a supporting surface for articles to be cut or sliced when it is mounted upon or assembled with the board 10, as illustrated in Fig. 2. In this case the snug fit of the pins 26 within the bores 30 prevents lateral play of one board relative to the other so that the unit provides a steady support for the work. At the same time the boards are held separated and can be readily disassembled by reason of the slide fit of the pins within the bores 30, by reason of the spacing of the boards by the parts 34 when the boards are assembled, and by reason of the bevels 40 which facilitate gripping of the parts. Thus the unit permits the parts to be used both separately and jointly for carving purposes and enables all of the advantages of carving or cutting boards to be accomplished by the use of one or the other or both of the constituent parts.

When the parts are assembled as illustrated in Fig. 2, they are arranged compactly. This is of substantial advantage from the standpoint of storing the unit. The compact arrangement entails also the interfit of the parts so that they will not accidentally be displaced or dislocated, one with respect to the other, within the storage space as the unit is contacted within the storage space incident to the insertion or removal of other articles in the use of the storage space. The top panel when interlocked with the pins serves the additional functions of protecting the pins against bending or damage incident to possible impact therewith and, of equal importance, serves as a guard to protect against personal injury by accidental contact with the pointed pins when a person is using the device or reaching into the storage space within which the unit is stored.

While the preferred embodiment of the invention has been described and shown herein, it will be understood that changes in the construction may be made within the scope of the appended claims without departing from the spirit of the invention.

I claim:

1. A carving board unit comprising a flat wood panel, a plurality of spaced rigid pointed pins carried by and projecting perpendicularly from the top face of said panel, a second flat wood panel having a plurality of apertures in its bottom face extending partly therethrough and arranged similarly to said pins, said apertures extending only partially through said second panel and each having a snug slide fit on a pin, and yielding members carried by and projecting from the bottom of said second panel and serving to space said panels when they are superimposed, said apertures being of a depth to receive said pins with the points of said pins spaced from the inner ends of the apertures.

2. A carving board unit as defined in claim 1, wherein said panels are of similar size and shape and one panel has at least one beveled edge portion adjacent to the other panel when said panels are superimposed, the upper faces of both panels constituting work supporting and carving faces.

HORACE P. WELLS.

REFERENCES CITED

The following references are of record in the file of this patent:

UNITED STATES PATENTS

| Number | Name | Date |
|---|---|---|
| 328,995 | Andrews | Oct. 27, 1885 |
| 556,120 | Wittemann | Mar. 10, 1896 |
| 943,767 | Bullard | Dec. 21, 1909 |
| 1,693,761 | Macripo | Dec. 4, 1928 |
| 1,973,438 | Lurba | Sept. 11, 1934 |

FOREIGN PATENTS

| Number | Country | Date |
|---|---|---|
| 12,748 | Great Britain | July 14, 1900 |
| 404,752 | Great Britain | Jan. 25, 1934 |